US008857898B1

(12) United States Patent
Dubaisi et al.

(10) Patent No.: US 8,857,898 B1
(45) Date of Patent: Oct. 14, 2014

(54) SPARE-TIRE COLLISION MANAGEMENT SYSTEM

(71) Applicant: Ford Global Technologies, LLC, Dearborn, MI (US)

(72) Inventors: Hassan Najib Dubaisi, Dearborn Heights, MI (US); Kris Allyn Warmann, Plymouth, MI (US); Anderson Luis de Castro Oliveira, Bahia (BR)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/963,287

(22) Filed: Aug. 9, 2013

(51) Int. Cl.
*B62D 43/04* (2006.01)
*B62D 25/20* (2006.01)

(52) U.S. Cl.
CPC ............... *B62D 43/04* (2013.01); *B62D 25/20* (2013.01)
USPC .................................... 296/187.11; 296/37.2

(58) Field of Classification Search
CPC ...... B62D 43/00; B62D 43/02; B62D 43/005; B62D 43/04; B62D 25/20
USPC ........ 296/37.2, 37.3, 187.11, 193.08, 203.04, 296/187.08, 193.07, 204; 224/42.12–42.3
See application file for complete search history.

(56) References Cited

U.S. PATENT DOCUMENTS

| | | | | |
|---|---|---|---|---|
| 3,642,296 A | * | 2/1972 | Froumajou | 280/834 |
| 4,060,270 A | | 11/1977 | Croissant | |
| 5,381,871 A | * | 1/1995 | Ohta | 180/296 |
| 5,419,609 A | * | 5/1995 | Kmiec et al. | 296/187.11 |
| 6,231,097 B1 | * | 5/2001 | Schell et al. | 296/37.2 |
| 7,677,651 B2 | * | 3/2010 | Yamaguchi et al. | 296/203.04 |
| 7,731,257 B2 | * | 6/2010 | Venuto et al. | 296/37.2 |
| 7,976,091 B2 | * | 7/2011 | Yamaguchi et al. | 296/37.2 |
| 8,033,353 B2 | * | 10/2011 | Sawauchi | 180/69.4 |
| 8,276,966 B2 | * | 10/2012 | Souma et al. | 296/37.2 |
| 8,282,146 B2 | * | 10/2012 | Izutsu et al. | 296/37.2 |
| 8,303,015 B2 | * | 11/2012 | Souma et al. | 296/37.2 |
| 8,308,215 B2 | * | 11/2012 | Souma et al. | 296/37.2 |
| 8,348,323 B2 | * | 1/2013 | Funakoshi | 296/37.2 |
| 8,371,595 B2 | * | 2/2013 | Taneda et al. | 280/124.109 |
| 8,388,041 B2 | * | 3/2013 | Sakita et al. | 296/37.2 |
| 8,556,335 B2 | * | 10/2013 | Mizoguchi | 296/187.11 |
| 8,657,364 B2 | * | 2/2014 | Yamada et al. | 296/187.11 |
| 2008/0073390 A1 | * | 3/2008 | Venuto et al. | 224/42.12 |
| 2009/0140014 A1 | * | 6/2009 | Sawauchi | 224/42.12 |
| 2012/0080906 A1 | * | 4/2012 | Sakita et al. | 296/187.11 |

FOREIGN PATENT DOCUMENTS

FR        2924669 A            6/2009
JP        2009-255663       *  11/2009      ............ B62D 25/20

* cited by examiner

*Primary Examiner* — Gregory Blankenship
(74) *Attorney, Agent, or Firm* — Raymond L. Coppielie; Brooks Kushman P.C.

(57) ABSTRACT

A collision management system comprising at least one of a guiding-bracket and a catch configured to inhibit forward movement of an under-hung spare-tire during a collision. The guiding-bracket may connect to and extend downward from a floor, or sprung-mass component, of the vehicle. The spare-tire may contact the guiding-bracket during a collision substantially inhibiting further movement, deflecting it downward away from the vehicle, deflecting it toward a suspension component, and/or deflecting it toward the catch. The catch may be connected to and extend upward from a suspension component. The catch may also inhibit spare-tire forward movement, may puncture the tire of the spare-tire, and may pull the spare-tire downward with the movement of the suspension component to which it is attached during the collision.

18 Claims, 3 Drawing Sheets

SPARE-TIRE COLLISION MANAGEMENT SYSTEM

TECHNICAL FIELD

This disclosure relates to the management of an under-vehicle hung spare-tire during a collision. Specifically, this disclosure relates to deflecting the spare-tire into another component which inhibits movement of the spare-tire during a collision.

BACKGROUND

A spare-tire is an additional tire carried in a vehicle intended as a replacement for a road-wheel that is no longer functioning. The term "spare-tire" is actually a misnomer, as the spare-tire is actually an assembly that has a tire mounted on a wheel ready for immediate use, although other systems have been used. A spare-tire could also be a spare wheel that has no tire in the assembly at all. A road-wheel is a vehicle wheel which may contact the ground and support the vehicle as the vehicle moves over the ground.

A spare-tire may be carried in the vehicle in various locations. Spare-tires have been stored in a spare-tire well, which is a recessed area in the trunk of a vehicle, usually in the center. A stiff sheet of cardboard may lie on top of the spare-tire well with the trunk carpet on top of it to hide the spare-tire and provide a pleasant look to and a flat surface for the trunk space. In mid-engined and rear-engined cars, the spare-tire may be stored in the front boot, which is similar to storage in the trunk. Some vehicles have even stored the spare-tire in the engine bay. Vehicles have also stored the spare-tire in the interior compartment of the vehicle or in a cargo area of the vehicle.

Vehicles have also mounted the spare-tire externally, such as on the rear gate, roof, side, or on the hood or bonnet of the vehicle. Other external storage solutions include storing the spare-tire underneath the vehicle. The under-vehicle hung spare-tire has advantages over storing the tire inside the vehicle, including saving interior space and not having to access panels, move seats, or empty/move cargo to access the wheel. However, it may be desired to manage the movement of the under-vehicle hung spare-tire during a collision.

SUMMARY

One aspect of this disclosure is directed to a system for guiding movement of a spare-tire hung under a rear-floor of a vehicle during a collision. The system has a guiding-bracket connected to the rear-floor of the vehicle forward of the spare-tire. The guiding-bracket is configured to deflect the spare-tire toward a rear-suspension component during the collision.

The guiding-bracket may include a surface angled downward from the rear-floor such that the spare-tire contacts the surface and is deflected downward from the floor during the collision. The guiding-bracket may also be two guiding-brackets substantially equally spaced apart from a longitudinal center-line of the spare-tire. The rear-suspension component may extend transversely across the vehicle, and may be an axle-beam. The system may provide that at least a portion of the spare-tire contacts the axle-beam inhibiting movement of the spare-tire during the collision.

The system may also have a catch connected to the rear-suspension component. The catch may extend upward from a transversely-extending rear-suspension component. The catch may be two catches substantially equally spaced apart from a longitudinal center-line of the spare-tire. The guiding-bracket may be configured to deflect at least a portion of the spare-tire into the catch during the collision. The catch may be configured to puncture a tire of the spare-tire. The catch may also contact a wheel of the spare-tire and in cooperation with the rear-suspension component inhibit movement of the spare-tire during the collision.

Another aspect of this disclosure is directed toward a system for managing a spare-tire hung under a floor of a vehicle during a collision. In this system, a guiding-bracket connects to and extends downwardly from the floor of the vehicle at a location offset of the spare-tire. The system also has a catch which connects to and extends upwardly from a suspension component at a location further offset from the spare-tire than the guiding-bracket. During a collision the guiding-bracket deflects a portion of the spare-tire toward the catch.

The catch may puncture a tire of the spare-tire during the collision. The catch may also contact a wheel of the spare-tire during the collision. The catch may be two catches substantially equally spaced apart from a center-line of the spare-tire. As well, the guiding-bracket may be two triangular-shaped guiding-brackets substantially equally spaced apart from a center-line of the spare-tire.

This system is also designed such that if during a collision the floor of the vehicle moves upward away from the suspension component defining a potential spare-tire passage path, the guiding-bracket and catch cooperate to substantially inhibit movement of the spare-tire through the potential spare-tire passage path. In this aspect of the disclosure, the suspension component may be an axle-beam. With this design, at least a portion of the spare-tire may also contact the axle-beam substantially inhibiting movement of the spare-tire past the axle-beam.

A further aspect of this disclosure is directed to a vehicular system for inhibiting movement of a spare-tire hung rearward of an unsprung-mass component forward of the unsprung-mass component during a collision. The vehicle is configured with a suspension that allows a portion of the vehicle to be a sprung-mass which rides on the suspension, and a portion of the vehicle to be an unsprung-mass which rides on the ground and supports the sprung-mass. In this aspect of the disclosure, a catch extends upward from an unsprung-mass component, and a guiding-bracket extends downward from a sprung-mass component offset from the spare-tire. During a collision, the guiding-bracket may be capable of deflecting the spare-tire into the catch substantially inhibiting movement of the spare-tire past the unsprung-mass component.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
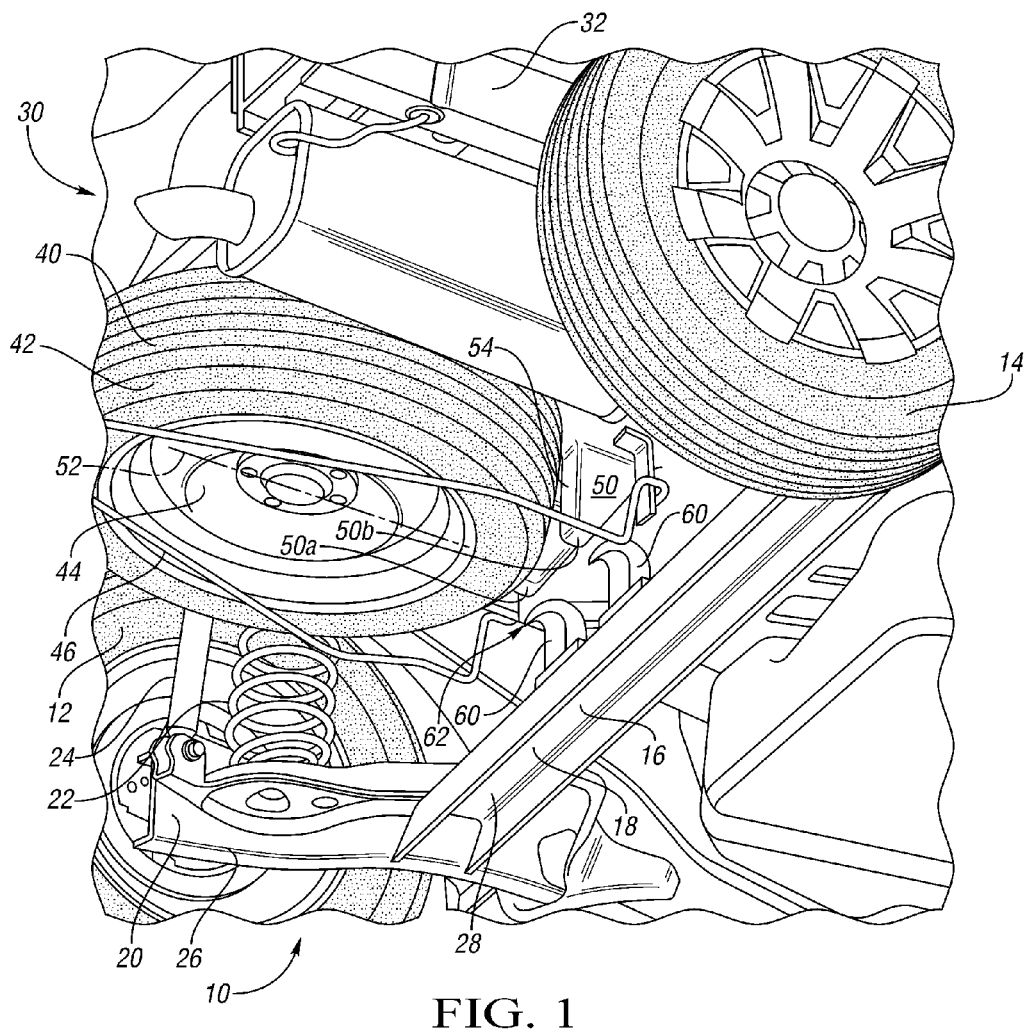
FIG. 1 is a partial underside view of a vehicle having an under-hung spare-tire.

FIG. 1 shows a partial view of an underside of a rear of a vehicle 10. The vehicle 10 has at least two ground-wheels 12, 14 connected to each other by an axle-beam 16 which extends transversely across the vehicle 10. The axle-beam 16 may be connected to trailing arms 20 (only the left trailing arm 20 is shown, as the right trailing arm is hidden behind the right ground-wheel 14) that provide a hub (not shown) for the two ground-wheels 12, 14 to be connected to the axle-beam 16 and rotate on the axle-beam 16. Although the suspension component 18 is shown as a rear non-driven axle-beam 16 from a front wheel drive vehicle, the suspension component 18 may also be a driven axle-beam in which a drive shaft and/or half-shafts extend through the axle-beam 16 to drive the ground-wheels 12, 14, may be either a front or rear axle-beam, or may be any one of a number of axle-beams that make up a multiple axled vehicle with three or more axles. The suspension component 18 may also be other non-limiting examples that include anti-sway bars, anti-twist bars, stabilizer bars, cross-members, differentials, control arms, trailing arms, knuckles, and corner-modules, and the like.

Springs 22 and shock absorbers 24 in combination with the axle-beam 16 and ground-wheels 12, 14 provide at least a portion of an unsprung-mass 26 of the vehicle 10. The unsprung-mass 26 of the vehicle 10 contacts the ground and bears the weight of the vehicle 10. An unsprung-mass component 28 may be any component that makes up the unsprung-mass 26 of the vehicle 10. A sprung-mass 30 is comprised of sprung-mass components 32 of the vehicle 10 including such things as a frame, body, engine, transmission, and interior compartment components of the vehicle 10. The sprung-mass 30 may also include such things that are not sprung-mass components 32, such as passengers and cargo.

A floor 34 of the vehicle 10 may have an underside exposed under the vehicle 10. The floor 34, as used here, may not have an upperside exposed in the interior, cargo area, or trunk of the vehicle; rather the term "floor" is intended to be broad and cover the underside of the vehicle 10 and/or underside of the sprung-mass 30. The floor 34 may comprise sheet metal body members, frame members, bumpers, under-vehicle components, or any combination of the above or the like.

A spare-tire 40 may be hung under the floor 34 of the vehicle 10. The spare-tire 40 may be disposed under a rear section of the floor 34 longitudinally rearward of suspension component 18. The spare-tire 40 may be connected to and part of the sprung-mass 30 of the vehicle 10. The spare-tire 40 may also be a tire 42 and wheel 44 assembly. The spare-tire 40 may be hung under the floor 34 by a cradle 46, or other connection system which allows the spare-tire to be dropped from under the floor 34 of the vehicle and used to replace a ground-wheel of the vehicle 10 when the ground-wheel is no longer functional for its intended use. Another non-limiting example may be that of a winch and cable system that connects to the hub section of the wheel 44 and may be unwound to drop the spare-tire down from the floor 34.

A guiding-bracket 50 may connect to and extend from the floor 34 or a sprung-mass component 32. The guiding-bracket 50 may be disposed at a location offset from the spare-tire 40. The guiding-bracket 50 may be disposed longitudinally forward of the spare-tire 40. The guiding-bracket 50 may be disposed at a location offset from a suspension component 18. The guiding-bracket 50 may be disposed longitudinally rearward from the suspension component 18. The guiding-bracket 50 may be disposed between the spare-tire 40 and the suspension component 18. The guiding-bracket 50 may have a surface 54 angled downward from the floor 34. The guiding-bracket 50 may be triangular-shaped. The surface 54 may be on a side of the guiding-bracket 50 facing the spare-tire 40.

The guiding-bracket 50 may be a single guiding-bracket 50, two guiding-brackets 50a, 50b as shown, or a number of guiding-brackets 50. In the case of two guiding-brackets 50a, 50b, they may be spaced apart from each other a substantially equal distance from a longitudinal center-line 52 of the spare-tire 40. The phrase "substantially equal distance," as used here, means that the difference in distance of the two guiding-brackets 50a, 50b from the center-line 52 is within 10 percent.

The guiding-bracket 50 is configured to deflect at least a portion of the spare-tire 40 downward during a collision. The spare-tire 40 may contact a surface of the guiding-bracket 50 and deflect downward from the floor 34. The guiding-bracket 50 may be configured to deflect the spare-tire 40 toward a suspension component 18 during a collision. At least a portion of the spare-tire 40 may contact a suspension component 18, such as the axle-beam 16, which substantially inhibits movement of the spare-tire 40 relative to the suspension component 18 during the collision. The phrase "substantially inhibits movement," as used here, means that portions of the spare-tire 40 may continue to experience movement, but the majority of the spare-tire 40 is contained by the suspension component 18 and there forward moves with the suspension component 18.

A catch 60 may connect to and extend from a suspension component 18 or an unsprung-mass component 28. The catch 60 may extend upwardly from a transversely extending suspension component 18. The catch 60 may be disposed at a location equal to or further offset from the spare-tire 40 than the guiding-bracket 50. The catch 60 may have a protrusion 62 that points toward the spare-tire 40. The catch 60 may have a protrusion 62 that points longitudinally rearward. The protrusion 62 may hook rearwardly and downwardly.

The catch 60 may be a single catch 60, two catches 60 as shown, or a number of catches 60. In the case of two catches 60, they may be spaced apart from each other a substantially equal distance from a longitudinal center-line 52 of the spare-tire 40. The phrase "substantially equal distance," as used here, means that the difference in distance of the two catches 60 from the center-line 52 is within 10 percent.

The catch 60 alone, in combination with the suspension component 18 from which it extends, or in combination with the guiding-bracket 50, substantially inhibits movement of the spare-tire 40 relative to the suspension component 18 during the collision. The phrase "substantially inhibits movement," as used here, means that portions of the spare-tire 40 may continue to experience movement, but the majority of the spare-tire 40 is contained by the suspension component 18 and moves with the suspension component 18.

The guiding-bracket 50 may be configured to deflect at least a portion of the spare-tire 40 into the catch 60 during a collision. In addition, during a rear collision the rear of the vehicle 10 may rise increasing the distance between the floor 34 of the vehicle and a suspension component 18, or between the sprung-mass components 32 and the unsprung-mass components 28, providing a potential spare-tire passage path 64 (see FIG. 5). In this scenario, the guiding-bracket 50 and catch 60 cooperate to substantially inhibit movement of the spare-tire 40 through the potential spare-tire passage path 64. The phrase "substantially inhibit movement," as used here, means that portions of the spare-tire 40 may continue to experience movement through the potential spare-tire passage path 64, but the majority of the spare-tire 40 does not pass completely through the potential spare-tire passage path 64.

Figure 4:
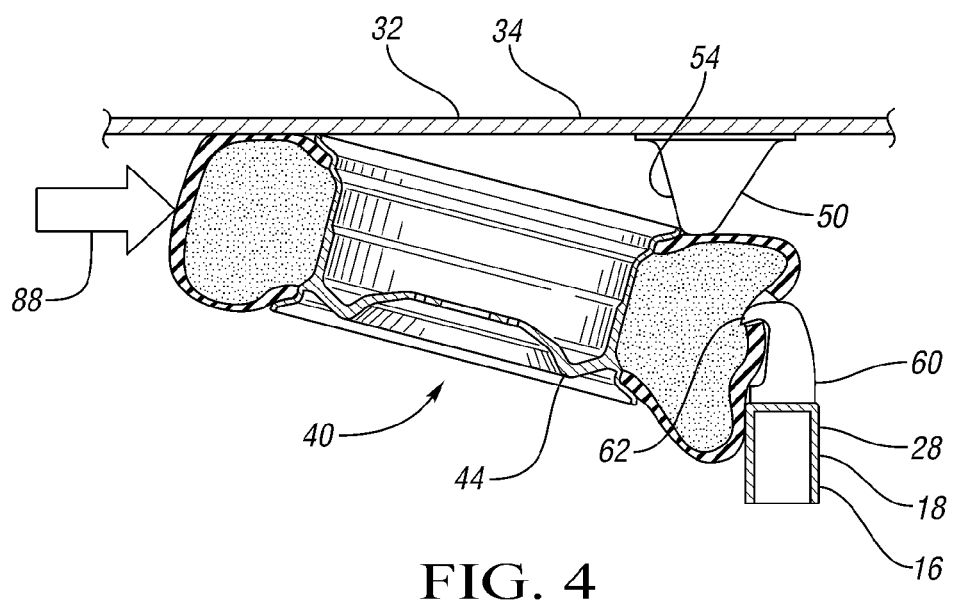
FIG. 4 is a diagrammatic cross-sectional view of an under-hung spare-tire moved further forward and directed further downward by a guiding-bracket into a catch of a spare-tire collision management system puncturing a tire of the spare-tire.

The catch 60 may also puncture the tire 42 of the spare-tire 40 (see FIG. 4). Puncturing of the tire 42 allows the air within the tire 42 to escape which in turn allows the spare-tire 40 to be reduced in volume. The catch 60 may also contact the wheel 44 of the spare-tire 40 (see FIG. 5). The hooked shaped protrusion 62 of the catch 60 may hook the rim of the wheel to substantially inhibit further movement of the spare-tire 40 during the collision. The catch 60, alone, in combination with the suspension component 18, or in combination with the guiding-bracket 50, substantially inhibits movement of the spare-tire 40 past the suspension component 18 during the collision. The phrase "substantially inhibits movement," as used here, means that portions of the spare-tire 40 may continue to experience movement past the suspension component 18, however, the majority of the spare-tire 40 does not move past the suspension component 18.

FIGS. 2-5 are diagrammatic views of an under-hung spare-tire 40 having a collision management system 70 disposed on or between a spare-tire 40 and a suspension component 18. The figures show a possible progression of the spare-tire 40, as effected by the collision management system 70 during a collision. The collision management system 70 comprises both a guiding-bracket 50 and a catch 60, although either may be used individually. In this figure the guiding-bracket 50 is connected to and extends downwardly from a representation of a sprung-mass component 32 or a floor 34. The guiding-bracket 50 is shown with an angled surface 54 and a generally triangular shape. The catch 60 is connected to and extends upwardly from a representation of an unsprung-mass component 28, or a suspension component 18, which may be a transversely-extending non-driven axle-beam 16. The catch is shown with a protrusion 62 with a generally hooked shape.

Figure 2:
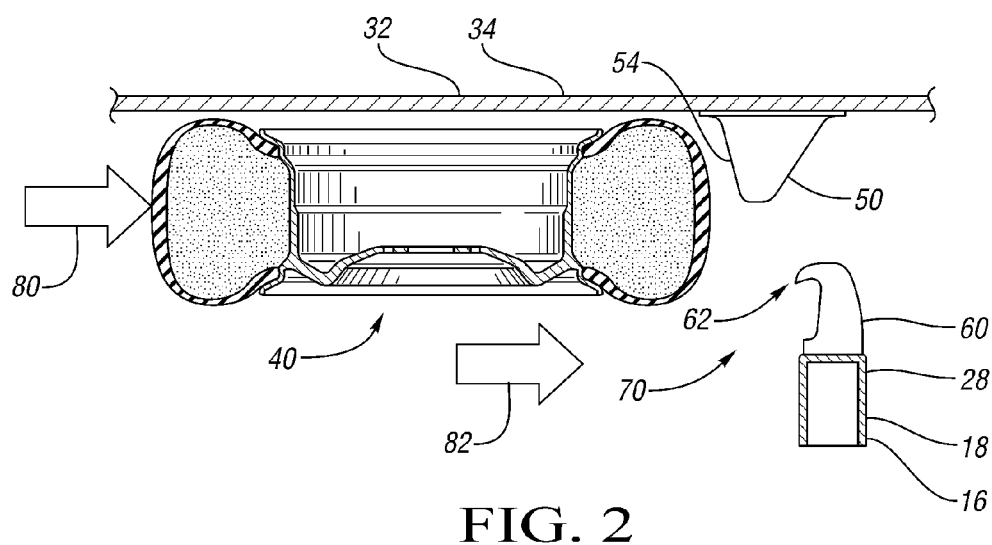
FIG. 2 is a diagrammatic cross-sectional view of an under-hung spare-tire having a collision management system disposed longitudinally forward of the spare-tire.

FIG. 2 depicts a moment in time when a collision has occurred that provides contact to the spare-tire 40 as indicated by arrow 80. In the case of a rear collision, contact 80 with the spare-tire 40 causes the spare-tire 40 to move longitudinally forward, as indicated by arrow 82, toward the collision management system 70. Although this example illustrates a forward movement of the spare-tire 40 as resulting from a rear collision, it should be noted that the system may be used to manage the movement of a spare-tire 40 in any desired direction as a result from a collision from any direction. As another non-limiting example, the spare-tire 40 may be hung longitudinally forward of a suspension component 18 and the system used to substantially inhibit rearward movement of the spare-tire 40 past the suspension component 18 during a front collision.

Figure 3:
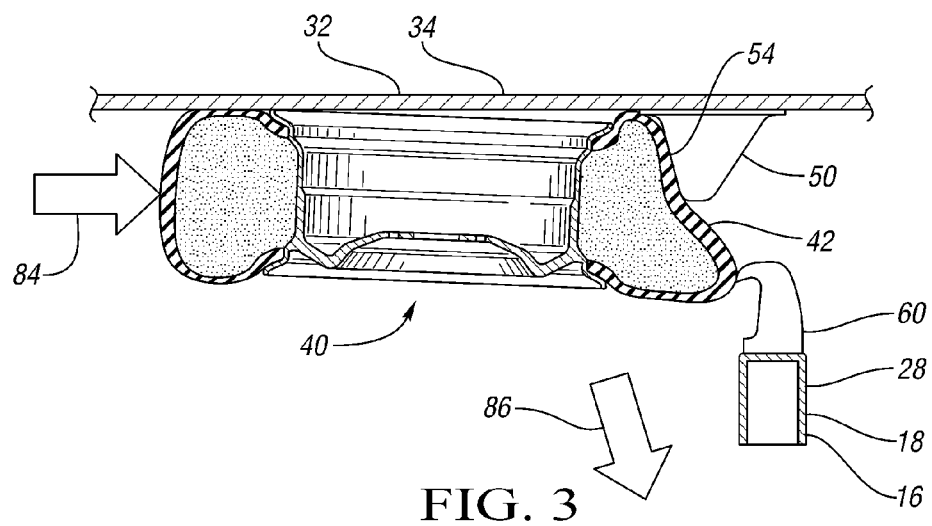
FIG. 3 is a diagrammatic cross-sectional view of an under-hung spare-tire moved forward and directed downward by a guiding-bracket of a spare-tire collision management system.

FIG. 3 depicts a moment in time, after the time as depicted in FIG. 2, when the rear collision continues to push the spare-tire 40 forward, as indicated by arrow 84. The spare-tire 40 contacts the guiding-bracket 50 deflecting the spare-tire 40 downward, as indicated by arrow 86. The guiding-bracket 50 may inhibit forward movement of the spare-tire 40. The spare-tire 40 may contact the angled surface 54 of the guiding-bracket 50. The tire 42 of the spare-tire 40 may deform. The guiding-bracket 50 may deflect the spare-tire 40 toward the suspension component 18, and/or the catch 60.

FIG. 4 depicts a moment in time, after the time depicted in FIG. 3, when the rear collision continues to push the spare-tire 40 forward, as indicated by arrow 88. In this figure, the guiding-bracket contacts the wheel 44 of the spare-tire 40 inhibiting forward movement, although contact of the guiding-bracket 50 with the wheel 44 may not always occur. The catch 60 is shown puncturing the tire 42 of the spare-tire 40, although puncturing of the tire 42 may not always occur. Puncturing of the tire 42 releases the air trapped between the tire 42 and wheel 44 of the spare-tire 40 and allows for a reduction in volume of the spare-tire 40. The guiding-bracket 50, the catch 60, and the suspension component 18 are shown cooperating to substantially inhibit forward movement of the spare-tire 40 past the suspension component 18 during the collision.

Figure 5:
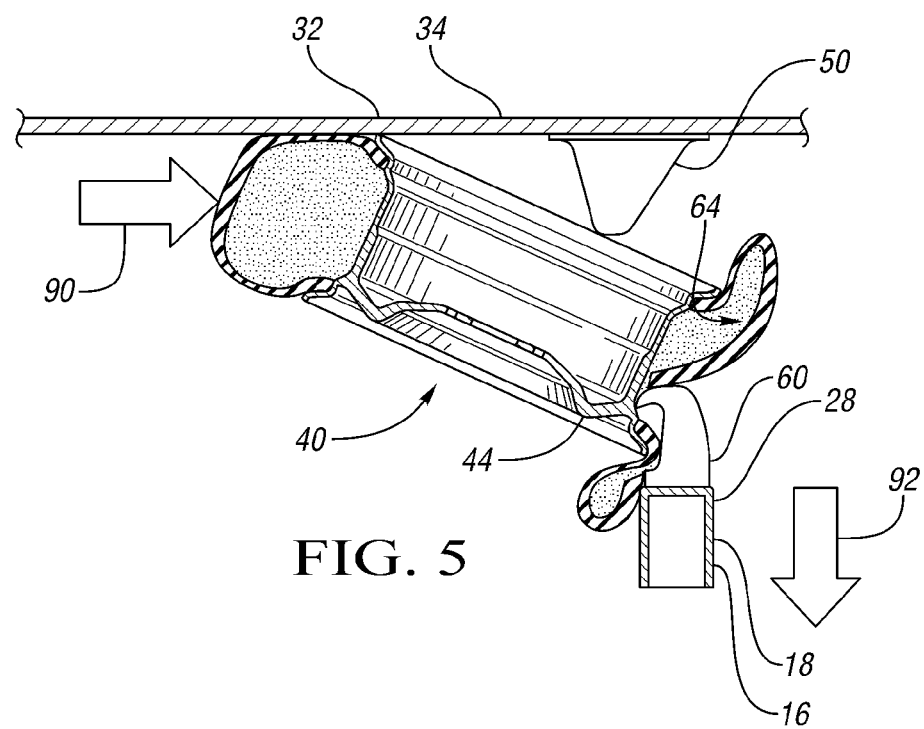
FIG. 5 is a diagrammatic cross-sectional view of an under-hung spare-tire moved further downward by a catch of a spare-tire collision management system puncturing a tire of the spare-tire and pulling the spare-tire downward.

FIG. 5 depicts a moment in time after the time depicted in FIG. 4, when the rear collision continues to push the spare-tire 40 forward, as indicated by arrow 90. The collision may also push upward the rear of the vehicle increasing the distance between the floor 34 and the suspension component 18, or increasing the distance between the sprung-mass component 32 and the unsprung-mass component 28, as indicated by arrow 92. The increased distance between the floor 34 and suspension component 18 may provide for a potential spare-tire passage path 64. In this scenario, the hooked shaped protrusion 62 of the catch may hook the spare-tire 40 and pull it downward with the movement of the suspension component 18 away from the floor 34.

The Guiding-bracket 50, catch 60, and suspension component 18 cooperate to substantially inhibit movement of the spare-tire 40 through the potential spare-tire passage path 64. The phrase "substantially inhibit movement," as used here, means that portions of the spare-tire 40 may continue to experience movement through the potential spare-tire passage path 64, but the majority of the spare-tire 40 is contained by the suspension component 18 and does not allow the entire spare-tire 40 to pass through the potential spare-tire passage path 64.

These figures illustrate an example of how the Guiding-bracket 50, catch 60, and suspension component 18, each alone or in cooperation with one or more of each other substantially inhibit movement of the spare-tire 40 during a collision.

While exemplary embodiments are described above, it is not intended that these embodiments describe all possible forms of the disclosed apparatus and method. Rather, the words used in the specification are words of description rather than limitation, and it is understood that various changes may be made without departing from the spirit and scope of the disclosure as claimed. The features of various implementing embodiments may be combined to form further embodiments of the disclosed concepts.

What is claimed is:

1. A system for guiding movement of a spare-tire hung under a rear-floor of a vehicle during a collision comprising:
   a guiding-bracket connected to the rear-floor forward of the spare-tire, wherein the guiding-bracket is configured to deflect the spare-tire toward a rear-suspension component during a collision, and wherein the rear-suspension component is an axle-beam extending transversely across the vehicle and at least a portion of the spare-tire contacts the axle-beam inhibiting forward movement of the spare-tire.

2. The system of claim 1 wherein the guiding-bracket includes a surface angled downward from the rear-floor such that the spare-tire contacts the surface and is deflected downward from the floor during the collision.

3. The system of claim 1 wherein the guiding-bracket is two guiding-brackets substantially equally spaced apart from a longitudinal center-line of the spare-tire.

4. The system of claim 1 further comprising a catch connected to the rear-suspension component, wherein during a collision the guiding-bracket is configured to deflect at least a portion of the spare-tire into the catch.

5. The system of claim 4 wherein the catch punctures a tire of the spare-tire.

6. The system of claim 5 wherein the catch contacts a wheel of the spare-tire and in cooperation with the rear-suspension component inhibits forward movement of the spare-tire.

7. The system of claim 4 wherein the catch extends upward from a transversely-extending rear-suspension component.

8. The system of claim 7 wherein the catch is two catches substantially equally spaced apart from a longitudinal center-line of the spare-tire.

9. A system for managing a spare-tire hung under a floor of a vehicle during a collision comprising:
   a guiding-bracket connected to and extending downwardly from the floor at a location offset of the spare-tire; and
   a catch connected to and extending upwardly from a suspension component at a location equal to or further offset from the spare-tire than the guiding-bracket;
   wherein during a collision the guiding-bracket deflects a portion of the spare-tire toward the catch.

10. The system of claim 9 wherein the catch in combination with the suspension component substantially inhibits the spare-tire from moving past the suspension component during the collision.

11. The system of claim 10 wherein the catch punctures a tire and contacts a wheel of the spare-tire during the collision.

12. The system of claim 9 wherein the guiding-bracket is two triangular-shaped guiding-brackets substantially equally spaced apart from a center-line of the spare-tire.

13. The system of claim 12 wherein the catch is two catches substantially equally spaced apart from a center-line of the spare-tire.

14. The system of claim 9 wherein the floor of a vehicle moves upward away from the suspension component in response to the collision defining a potential spare-tire passage path, the guiding-bracket and catch cooperate to inhibit movement of the spare-tire through the potential spare-tire passage path.

15. The system of claim 9 wherein the suspension component is an axle-beam and at least a portion of the spare-tire contacts the axle-beam inhibiting movement of the spare-tire past the axle-beam.

16. A system for inhibiting movement of a spare-tire past an unsprung-mass component on a vehicle comprising:
   a catch extending upward from the unsprung-mass component;
   and a guiding-bracket extending downward from a sprung-mass component between the spare-tire and the unsprung-mass component;
   wherein the guiding-bracket is capable of deflecting the spare-tire into the catch substantially inhibiting movement of the spare-tire past the unsprung-mass component during a collision.

17. The system of claim 16 wherein the guiding-bracket and catch are two guiding-brackets and two catches each substantially equally spaced apart from a longitudinal center-line of the spare-tire.

18. The system of claim 16 wherein the catch punctures a tire and contacts a wheel of the spare-tire during the collision.

* * * * *